United States Patent Office 2,983,714
Patented May 9, 1961

2,983,714

CROSS-LINKING OF COPOLYMERS OF ETHYLENE AND PROPYLENE

Anderson E. Robinson, Newark, and William D. Willis, Wilmington, Del., assignors to Hercules Powder Company, Wilmington, Del., a corporation of Delaware No Drawing. Filed Dec. 26, 1957, Ser. No. 705,127

6 Claims. (Cl. 260—79.5)

This invention relates to a process for cross-linking copolymers of ethylene and propylene.

Recent improvements in the art of polymerization have enabled the production of normally solid copolymers of ethylene and propylene that were unobtainable by older methods. These copolymers have been found to be useful for a variety of purposes. For example, they can be molded into various forms and shapes or can be extruded in the form of films to provide many articles of everyday use.

The present invention is particularly concerned with a method by which normally solid copolymers of ethylene and propylene can be cross-linked to provide an ultimate improvement in physical properties and thus extend their range of usefulness.

It is already known that copolymers of ethylene and propylene can be cross-linked by free radical mechanisms to lower the degree of thermoplasticity and improve solvent resistance. More specifically, it is known that certain organic peroxides are very effective agents for promoting the cross-linking of such copolymers and that when the cross-linking is carried out in the presence of fillers, preferably carbon black, an improvement in strength is realized.

In accordance with the present invention, it has been found that when a copolymer of ethylene and propylene is heated to an elevated temperature in the presence of additives including minor amounts of (1) a di(aralkyl) peroxide of the formula:

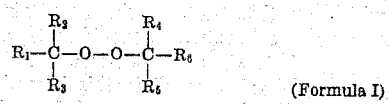

(Formula I)

wherein $R_1$ and $R_6$ are aryl radicals and $R_2$, $R_3$, $R_4$ and $R_5$ are hydrogen or alkyl groups of less than four carbon atoms, (2) sulfur, (3) red lead ($Pb_3O_4$) and (4) a quinone oximino compound, there results cross-linking of the copolymer and improvement in its physical properties to a level that is not obtainable when any one of the specified additives is not present.

The following examples are presented for the purpose of illustrating the invention. Parts and percentages are by weight unless otherwise specified. The molecular weight of the copolymers employed in the examples is shown by the reduced specific viscosity (RSV) given for each. By the term "reduced specific viscosity" is meant the specific viscosity, corrected to zero shear gradient, divided by the concentration of the solution in grams per 100 milliliters, measured at 135° C., on a solution in decalin containing 0.1 gram of the copolymer in 100 milliliters of the solution.

EXAMPLE 1

The copolymer treated in this example was prepared by the copolymerization of ethylene and propylene in n-heptane in equimolar proportions at a temperature of about 60° C. and at atmospheric pressure. The catalyst for the copolymerization was a mixture of a hydrocarbon-insoluble reaction product of titanium tetrachloride and aluminum sesquichloride (an equimolar mixture of diethyl aluminum chloride and ethyl aluminum chloride) and aluminum triisobutyl. The copolymer had an RSV of 4.3.

In preparing compositions according to the invention there was first prepared a master batch of the above described copolymer and half its weight of high-abrasion furnace black by milling for five minutes on a two-roll mill at a batch temperature of about 180–200° F. The master batch was next divided into portions. Into each portion there was incorporated a combination of additives by milling on a two-roll mill for five minutes at 180–200° F. The compositions so prepared were of the following formulation:

*Table I*

|  | Parts—Composition No. | | |
|---|---|---|---|
|  | 1 | 2 | 3 |
| Copolymer | 100 | 100 | 100 |
| Bis($\alpha,\alpha$-dimethylbenzyl) peroxide | 1 | 2 | 4 |
| High abrasion furnace black | 50 | 50 | 50 |
| Quinone dioxime | 1 | 2 | 4 |
| $Pb_3O_4$ | 5 | 10 | 20 |
| Sulfur | 1 | 2 | 4 |

Each formulation was pressure cured at 320° F. in a 1 inch x 4½ inch x 30 mil mold cavity. The cured compositions were tested for tensile strength, percentage elongation at break and modulus at various degrees of elongation. The test results on specimens aged 48 hours at 212° F. were as follows:

*Table II*

| Composition No. | Tensil Strength [1] (p.s.i.) | Max. Elong. [1] (percent) | Modulus at Indicated Percent Elongation [1] | | | |
|---|---|---|---|---|---|---|
|  |  |  | 100 | 200 | 300 | 400 |
| 1 | 2,545 | 520 | 315 | 610 | 1,150 | 1,690 |
| 2 | 3,205 | 430 | 485 | 1,090 | 1,845 | 2,590 |
| 3 | 3,185 | 355 | 600 | 1,440 | 2,450 | -------- |

[1] Average of two tests.

Particularly outstanding are the combinations of high moduli and high tensile strengths obtained at relatively low peroxide levels.

An indication that each of the four additives, i.e., peroxide, sulfur, quinone dioxime and red lead, is essential for the obtention of such properties is provided by the fact that when only bis($\alpha,\alpha$-dimethylbenzyl) peroxide was added to the master batch in any of the concentrations listed above, a maximum tensile strength after cure of only about 1500 p.s.i. is realized and by the fact that when both the peroxide and sulfur were omitted from the above formulation, tensile strengths in the range of only 500–800 p.s.i. after cure were obtained. The data presented in later examples furnish additional evidence that each of the four specified additives is essential to obtain the benefits of the invention.

EXAMPLE 2

Employing the same copolymer as in Example 1, a series of compositions was prepared by first preparing a master batch containing the copolymer and half its weight of high-abrasion furnace black. The master batch was then divided into equal portions and compositions of the following formulations were prepared as described in Example 1:

*Table III*

| Composition No. | 1 | 2 | 3 | 4 | 5 |
|---|---|---|---|---|---|
| Copolymer (parts) | 100 | 100 | 100 | 100 | 100 |
| High-abrasion furnace black (parts) | 50 | 50 | 50 | 50 | 50 |
| Sulfur (parts) | 0 | 2 | 2 | 2 | 2 |
| Bis($\alpha,\alpha$-dimethylbenzyl) peroxide (parts) | 2 | 2 | 0 | 2 | 2 |
| Quinone dioxime (parts) | 2 | 2 | 2 | 0 | 2 |
| Pb$_3$O$_4$ (parts) | 10 | 10 | 10 | 10 | 0 |

The compositions were molded under pressure in cavities of 1 inch x 4 inch x 60 mils for thirty minutes at 320° F. and specimens cut from the molded sheets were tested for tensile strength and elongation at break. The test results on unaged test specimens were as follows:

*Table IV*

| Composition No. | Tensile Strength [1] (p.s.i.) | Elongation [1] (Percent) |
|---|---|---|
| 1 | 2,115 | 790 |
| 2 | 2,565 | 990 |
| 3 | 460 | 1,270 |
| 4 | 2,155 | 990 |
| 5 | 2,365 | 980 |

[1] Average of two tests.

It is seen from the data that the omission of any one of the four specified additives is detrimental to strength.

EXAMPLES 3–14

Evidence showing similar beneficial effect from the four specified additives was obtained when each of the following peroxides was substituted for bis($\alpha,\alpha$-dimethylbenzyl) peroxide in the procedure of Example 2:

Example 3—Bis($\alpha,\alpha$-dimethyl-p-t-butylbenzyl) peroxide
Example 4—Bis($\alpha,\alpha$-dimethyl-p-isopropylbenzyl) peroxide
Example 5—Bis($\alpha,\alpha$-dimethyl-p-methylbenzyl) peroxide
Example 6—Bis($\alpha$-isopropylbenzyl) peroxide
Example 7—Benzyl($\alpha,\alpha$-dimethyl-p-isopropylbenzyl) peroxide Similar evidence was also obtained by substituting for the quinone dioxime of Example 2 other quinone oximino compounds including:

Example 8—Quinone dioxime dibenzoate
Example 9—o-Benzoquinone dioxime
Example 10—1,4-naphthoquinone dioxime
Example 11—o-Benzoquinone dioxime dibenzoate
Example 12—o-Benzoquinone dioxime diacetate
Example 13—Quinone monoxime
Example 14—o-Toluquinone monoxime The normally solid copolymers of ethylene which are treated in accordance with the invention are materials known to the art which can be prepared by copolymerizing ethylene with propylene. The preferred copolymers in the practice of the invention are those which contain from about 15 to 90 mole percent of ethylene, but the copolymers can also contain small amounts of one or more additional unsaturated compounds that are copolymerizable with ethylene and propylene. Such copolymers can be made by any of several processes now known to the art. They can be prepared, for example, by polymerizing ingredients including ethylene and propylene under relatively mild conditions of temperature and pressure in the presence of a catalyst comprising a mixture of a compound of a metal of groups IV—B, V—B or VI—B of the periodic table in combination with an organometallic compound of an alkali metal, alkaline earth metal, zinc, earth metal (especially aluminum) or rare earth metal. The compound of a group IV—VI—B metal may be any inorganic salt or organic salt or complex of titanium, zirconium, hafnium, vanadium, columbium, tantalum, chromium, molybdenum, tungsten, thorium or uranium. Exemplary of such compounds are titanium and zirconium tetrachlorides, tetrabutyl titanate, zirconium acetylacetonate, vanadium oxyacetylacetonate, chromium acetylacetonate, etc. The organometallic compound that is used in combination with the transition metal compound may be any organo compound of an alkali metal, alkaline earth metal, zinc, earth metal, or rare earth metal as, for example, alkali metal alkyls or aryls such as butyllithium, amylsodium, phenylsodium, etc., dimethylmagnesium, diethylmagnesium, diethylzinc, butylmagnesium chloride, phenylmagnesium bromide, alkyl- or aryl-aluminum compounds as, for example, triethylaluminum, tripropylaluminum, triisobutylaluminum, trioctylaluminum, dimethylaluminum chloride, diethylaluminum chloride, ethylaluminum dichloride, the equimolar mixture of the latter two known as aluminum sesquichloride, diisobutylaluminum chloride or fluoride, diethylaluminum hydride, ethylaluminum dihydride, diisobutylaluminum hydride, triphenylaluminum, diphenylaluminum chloride, etc., and complexes of such organometallic compounds as, for example, sodium aluminum tetraethyl, lithium aluminum tetraoctyl, etc. The polymerization is usually carried out by mixing the two catalyst components in a diluent such as a hydrocarbon solvent and then passing ethylene and propylene into the catalyst mixture at atmospheric or slightly elevated pressure and at room temperature or moderately elevated temperatures.

Alternatively, the copolymers processed in the invention can be prepared, for example, by the method described in Belgian Patent No. 535,082 which method is characterized by contacting ingredients including ethylene and propylene under polymerizing conditions with a catalyst containing, as the essential ingredients, an oxide of chromium associated with an oxide of silicon, aluminum, zirconium or thorium.

Still further, such copolymers can be prepared, for example, by the methods described in U.S. 2,700,663, 2,702,288, and 2,726,231 in which the copolymerization of ethylene and propylene is accomplished by bringing a mixture of the two compounds into contact with a sub-hexavalent molybdenum-oxygen compound combined with an active alumina, titania or zirconia support at a temperature between about 100° C. and 300° C. and a pressure between atmospheric and 5000 p.s.i.g.

The peroxides useful in this invention are di(aralkyl) peroxides having the structural formula:

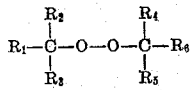

where $R_1$ is an aryl group, $R_2$, $R_3$, $R_4$ and $R_5$ are hydrogen or alkyl groups of less than 4 carbon atoms, and $R_6$ is an aryl group. $R_2$, $R_3$, $R_4$ and $R_5$ may all be the same or each may be a different group or any two or more may be the same or different. Similarly, $R_1$ and $R_6$ may be the same or different aryl groups.

The aryl groups referred to in the above formula may, for example, be phenyl, naphthyl, anthryl, phenanthryl, and the like. The aryl groups may contain alkyl substituents as in the case of methylphenyl, ethylphenyl, propylphenyl, isopropylphenyl, butylphenyl, isobutylphenyl, t-butylphenyl, pentamethylethylphenyl, dimethylphenyl, methylethylphenyl, etc., and corresponding alkyl derivatives of the other aryl groups mentioned. The term "aryl" as used herein includes alkaryl groups. When an alkyl substituent in an aryl group contains less than 4 carbon atoms, it may be the same as or different from any of $R_2$, $R_3$, $R_4$ or $R_5$. Aryl groups in which the alkyl substituents, if any, contain less than 8 carbon atoms are preferred.

The class of di(aralkyl) peroxides useful in the invention include the following symmetrical or bis(aralkyl) peroxides:

dibenzyl peroxide,
bis(α-methylbenzyl) peroxide,
bis(α-ethylbenzyl) peroxide,
bis(α-propylbenzyl) peroxide,
bis(α-isopropylbenzyl) peroxide,
bis(α,α-dimethylbenzyl) peroxide,
bis(α-methyl-α-ethylbenzyl) peroxide,
bis(α,α-diethylbenzyl) peroxide,
bis(α,α-dipropylbenzyl) peroxide,
bis(α,α-diisopropylbenzyl) peroxide,
bis(α,α-diisopropylnaphthylmethyl) peroxide,
bis(α,α-dimethylnaphthylmethyl) peroxide,
bis(α,α-dimethyl-p-methylbenzyl) peroxide,
bis(α-methyl-α-ethyl-p-methylbenzyl) peroxide,
bis(α,α-diethyl-p-methylbenzyl) peroxide,
bis(α,α-diisopropyl-p-methylbenzyl) peroxide,
bis(α,α-dimethyl-p-ethylbenzyl) peroxide,
bis(α-methyl-α-ethyl-p-ethylbenzyl) peroxide,
bis(α,α-diethyl-p-ethylbenzyl) peroxide,
bis(α,α-diisopropyl-p-ethylbenzyl) peroxide,
bis(α,α-dimethyl-p-isopropylbenzyl) peroxide,
bis(α-methyl-α-ethyl-p-isopropylbenzyl) peroxide,
bis(α,α-diethyl-p-isopropylbenzyl) peroxide,
bis(α,α-diisopropyl-p-isopropylbenzyl) peroxide,
bis(α,α-dimethyl-p-t-butylbenzyl) peroxide,
bis(α-methyl-α-ethyl-p-t-butylbenzyl) peroxide,
bis(α,α-diethyl-p-t-butylbenzyl) peroxide,
bis(α,α-diisopropyl-p-t-butylbenzyl) peroxide,
bis(α,α-dimethyl-p-pentamethylethylbenzyl) peroxide,
bis(α-methyl-α-ethyl-p-pentamethylethylbenzyl) peroxide,
bis(α,α-diethyl-p-pentamethylethylbenzyl) peroxide, and
bis(α,α-diisopropyl-p-pentamethylethylbenzyl) peroxide.

Unsymmetrical peroxides useful in the invention containing two aryl groups include the following compounds:

benzyl(α-methylbenzyl) peroxide,
benzyl(α-methyl-p-methylbenzyl) peroxide,
benzyl(α-methyl-p-isopropylbenzyl) peroxide,
benzyl(α,α-dimethylbenzyl) peroxide,
benzyl(α,α-dimethyl-p-methylbenzyl) peroxide,
benzyl(α,α-dimethyl-p-isopropylbenzyl) peroxide,
α-methylbenzyl(α,α-dimethylbenzyl) peroxide,
α-methylbenzyl(α,α-dimethyl-p-methylbenzyl) peroxide,
α-methylbenzyl(α,α - dimethyl - p - isopropylbenzyl) peroxide,
α-isopropylbenzyl(α,α-diisopropylbenzyl) peroxide,
α,α-dimethylbenzyl(α,α-dimethyl - p - methylbenzyl) peroxide,
α,α - diisopropylbenzyl(α,α - diisopropyl-p-methylbenzyl) peroxide, and
α,α - diisopropylbenzyl(α,α - diisopropyl - p - isopropylbenzyl) peroxide.

In general, the peroxides are characterized by containing at least 14 carbon atoms and usually not more than about 40 carbon atoms. Di(aralkyl) peroxides containing 14 to about 25 carbon atoms are preferred as producing very desirable vulcanizates and because they may be prepared from readily available materials. The symmetrical peroxides are exceptionally useful since they can be prepared in higher yields more easily than the unsymmetrical peroxides.

The quinone oximino compounds useful in the invention are compounds characterized by the nucleus:

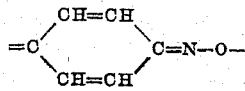

numerous examples of which have already been presented.

The process of the invention is characterized by heating a copolymer of the type defined in the presence of the four specified additives, namely, the di(aralkyl) peroxide of Formula I, sulfur, red lead and a quinone oximino compound. There are various ways in which these additives can be blended or incorporated with the copolymer prior to heating. For example, the ingredients may be uniformly blended by simple milling on a conventional rubber mill with or without a small amount of solvent to temporarily plasticize the copolymer. In this way, the additives become uniformly distributed throughout the copolymer and uniform cross-linking is effected when the blend is subjected to heat. Other methods of incorporating the additives with the copolymer will be apparent to those skilled in the art, the method chosen depending primarily on the convenience of the operator and the objective in mind.

The amount of di(aralkyl) peroxide in relation to the amount of copolymer is quite widely variable but the optimum amount depends on such factors as the initial molecular weight of the copolymer, the temperature at which cross-linking is to be carried out, the amount of other additives present, etc. Generally speaking, however, the optimum amount of peroxide will be within the range of about 0.1–20% by weight of the copolymer but more often will be in the narrower range of from 1–10%. The amount of sulfur that is required to achieve the benefits of the invention is also widely varied and the optimum amount will normally be from 0.25 to 5% by weight of the copolymer. Of course, as in the case of the peroxide, the optimum amounts of the sulfur will vary according to changes in the other factors in the invention.

The amount of quinone oximino compound is also variable and generally the optimum will be found between about 0.1 to 20% by weight of the copolymer, more often within the range of 1 to 10%.

The proportion of red lead is likewise subject to considerable variation and, as a practical guide, an amount of red lead between the range of 2 to 25% by weight of the copolymer should be found suitable.

The temperature to which the copolymer must be heated in the presence of the specified additives to bring about cross-linking is not critical. Cross-linking can be effected, for example, by heating to within the range of about 270–400° F. for a time, varying inversely with temperature of from about 2 to 100 minutes.

The manner in which the blend of copolymer and additives is heated is subject to choice according to the objective in mind. For example, a copolymer containing the specified additives can be molded by pressure or extrusion while at the same time applying heat to raise the temperature to that required for cross-linking. In some cases it may be sufficient merely to heat the copolymer in an oven or equivalent apparatus.

In addition to the essential additives which have been named, other ingredients can also be present. Such ingredients include those used in the art of rubber vulcanization, such as, for example, extenders, fillers, pigments, plasticizers, etc. The presence of a filler, in particular, is beneficial and among the fillers, carbon black has been shown to provide excellent results in the practice of the invention. It is, of course, just as in rubber compounding, with the use of a filler that optimum results are obtained. There are, however, many cases in which a filler is not required or is undesired and in such cases the benefit of the four additives is still apparent.

What we claim and desire to protect by Letters Patent is:

1. The process of cross-linking a solid copolymer of ethylene and propylene containing from about 15 to 90 mole percent of ethylene in copolymerized form which comprises heating said copolymer in the presence of minor amounts of (1) a di(aralkyl) peroxide having the formula:

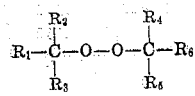

where $R_1$ and $R_6$ are aryl groups and $R_2$, $R_3$, $R_4$ and $R_5$ are selected from the group consisting of hydrogen and alkyl groups of less than 4 carbon atoms, (2) sulfur, (3) red lead and (4) a quinone oximino compound to a temperature at which cross-linking takes place, said quinone oximino compound being selected from the group consisting of the mono- and di-oximes of benzoquinones and naphthoquinones and the organic acid esters of said oximes.

2. The process of claim 1 in which the amount of di(aralkyl) peroxide is from about 0.1 to 20% by weight of the copolymer.

3. The process of claim 1 in which the peroxide is bis($\alpha,\alpha$-dimethylbenzyl) peroxide.

4. The process of claim 1 in which the amount of sulfur ranges from about 0.25 to 5% by weight of the copolymer.

5. The process of claim 1 in which the copolymer is heated to a temperature in the range of from about 270 to 400° F.

6. A cross-linked copolymer of propylene and ethylene containing from about 15 to 90 mole percent of ethylene in copolymerized form which has been prepared by heating said copolymer in the presence of minor amounts of (1) a di(aralkyl) peroxide having the formula:

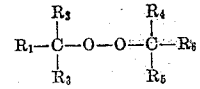

where $R_1$ and $R_6$ are aryl groups and $R_2$, $R_3$, $R_4$ and $R_5$ are selected from the group consisting of hydrogen and alkyl groups of less than 4 carbon atoms, (2) sulfur, (3) red lead and (4) a quinone oximino compound to a temperature at which cross-linking takes place, said quinone oximino compound being selected from the group consisting of the mono- and di-oximes of benzoquinones and naphthoquinones and the organic acid esters of said oximes.

References Cited in the file of this patent
UNITED STATES PATENTS

| | | |
|---|---|---|
| 2,445,283 | Sterrett | July 13, 1948 |
| 2,748,104 | Viohl | May 29, 1956 |
| 2,826,570 | Ivett | Mar. 11, 1958 |

FOREIGN PATENTS

| | | |
|---|---|---|
| 659,958 | Great Britain | Oct. 31, 1951 |